Feb. 16, 1954    E. J. SIEVERS    2,669,366
UNLOADING MECHANISM FOR MOTOR VEHICLES
Filed June 4, 1951    2 Sheets-Sheet 1
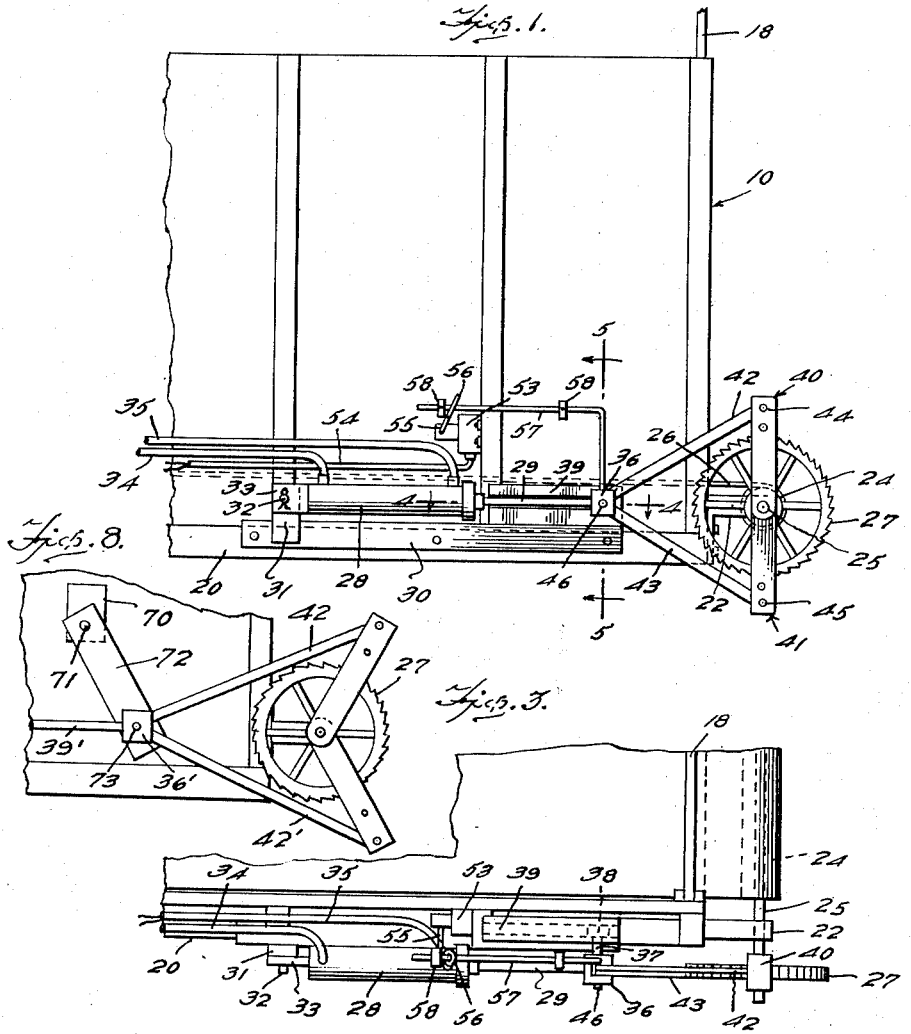
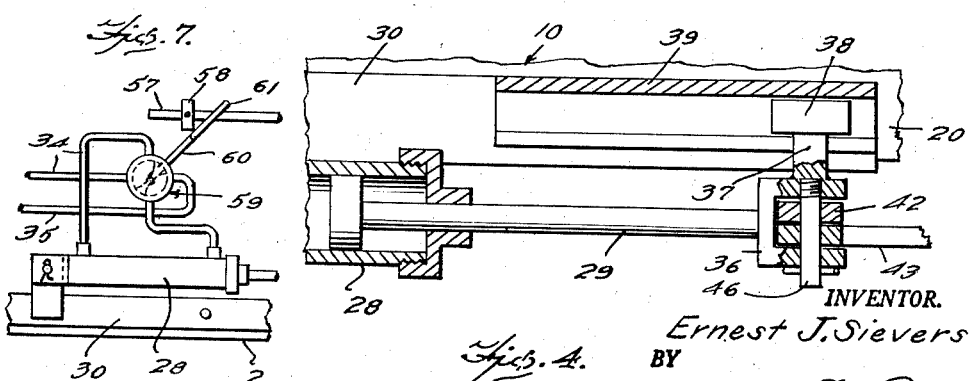
INVENTOR.
Ernest J. Sievers
BY
Wilfred E. Lawson
ATTORNEY Feb. 16, 1954   E. J. SIEVERS   2,669,366
UNLOADING MECHANISM FOR MOTOR VEHICLES
Filed June 4, 1951   2 Sheets-Sheet 2
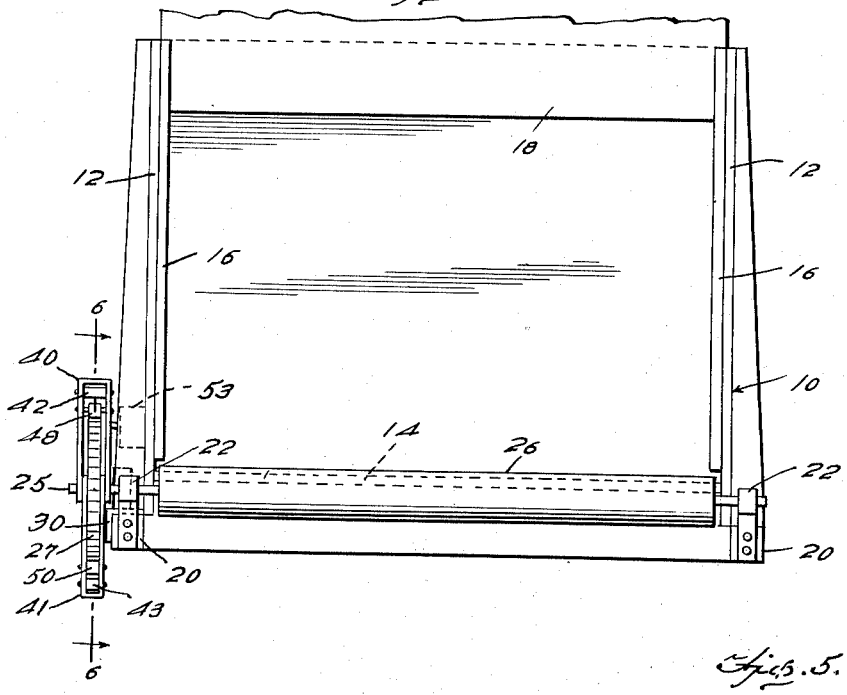
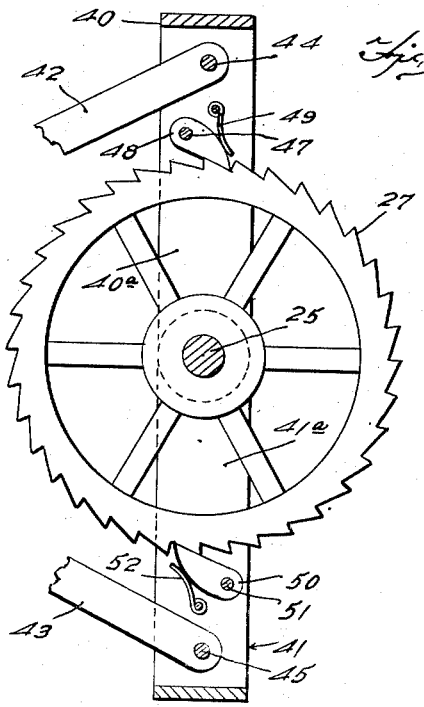
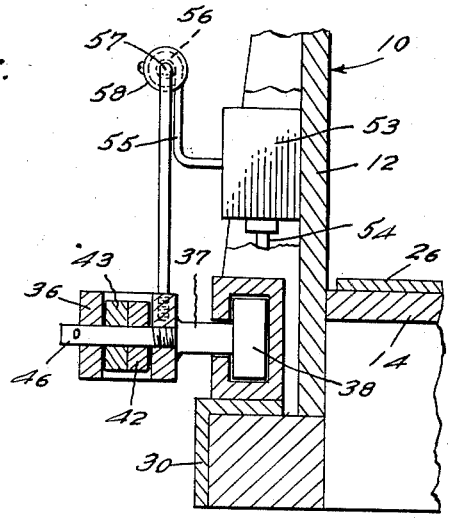
INVENTOR.
Ernest Sievers
BY
Wilfred E Lawson
ATTORNEY Patented Feb. 16, 1954

2,669,366

UNITED STATES PATENT OFFICE 2,669,366

UNLOADING MECHANISM FOR MOTOR VEHICLES

Ernest John Sievers, Newell, Iowa

Application June 4, 1951, Serial No. 229,838

3 Claims. (Cl. 214—83.34)

This invention relates generally to load carrying vehicles and is directed particularly to improvements in vehicles equipped with material unloading means.

The present invention is directed more particularly to a wheeled vehicle such as a wagon or truck, used for hauling material such as chopped ensilage and having a moving bottom unit for facilitating the discharge of the material therefrom, a particular object of the present invention being to provide a fluid operated drive means for the said movable bottom unit by which said bottom unit may be actuated automatically to effect the steady and continuous unloading of the contents of the vehicle.

Another object of the invention is to provide in a structure of the above described character a fluid driven pawl and ratchet mechanism for applying continuous movement to said movable bottom.

A still further object of the invention is to provide in the structure above set forth an automatic electric control means for said fluid drive for producing a desired reciprocatory motion of the drive.

A still further object of the invention is to provide in a material carrying vehicle of the character described having a canvas or other similar type of material, floor covering with a rotatable cylinder across the rear end of the vehicle floor on which said covering is wound, with a fluid piston actuated pawl and ratchet mechanism for effecting the rotation of the roll up cylinder and an electric control means operatively coupled with said piston for controlling a reversible electrically driven pumping mechanism whereby said piston is given back and forth movement for the operation of said pawl and ratchet means.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawings:

Figure 1 is a view in side elevation of the rear end portion of a truck showing the mechanism of the present invention applied thereto.

Figure 2 is a rear end elevation of the same.

Figure 3 is a view in top plan of the mechanism and a portion of the truck body.

Figure 4 is a sectional view taken substantially on the line 4—4 of Figure 1.

Figure 5 is a transverse section taken substantially on the line 5—5 of Figure 1.

Figure 6 is a sectional view taken substantially on the line 6—6 of Figure 2 and on an enlarged scale.

Figure 7 is a detail view of a fluid line control valve which may be used in place of the control switch.

Figure 8 is a view illustrating in side elevation a modified mounting for the outer end of the piston rod with which the pawl actuating pitmans are connected.

The mechanical unloading mechanism for trucks, wagons and the like forming the subject matter of the present invention may be either mechanically or electrically controlled.

Farm tractors are manufactured which are equipped with electrically controlled fluid pumps and hydraulic cylinders connected therewith for the accomplishment of certain types of work, the electric control means for such pumps including a three-way over center switch by means of which the fluid pump may be driven in either of two directions to effect the forward and reverse movement of a fluid piston.

In the illustration of the present invention such electrically operated pump mechanism is not illustrated or described since this is a standard well known structure and forms no part of the present invention.

Referring now more particularly to the drawings there is shown a wheeled vehicle in the form of a wagon or truck which is generally designated 10 and which has a box body including the upstanding side walls 12 and floor 14, the rear end portions of the box side walls 12 having the vertical guides 16 in which is slidably supported a tail gate 18 which may be raised or lowered in any conventional manner, no particular control means for the gate here being illustrated.

Secured to the back end of the floor structure which includes the side beams 20, are suitable bearings 22 between which is positioned a long roller 24 carried upon a shaft 25 which is rotatably mounted in the bearings.

The numeral 26 designates a sheet of fabric material such as heavy canvas or the like which is a width substantially equaling the floor width of the wagon box and is intended to cover the floor 14 and have one end attached to the roller 24 so that when the roller is rotated the canvas or fabric floor covering unit will be wound up thereon.

It is a general practice on farms to equip wagons used for hauling chopped ensilage, or other material, with such a canvas unit designed to be rolled up at the back of the wagon floor. This canvas unit is drawn over the floor to completely cover the same before the wagon is loaded. The load is then placed in the wagon box on the covering unit 26 and when it is to be unloaded the cylinder or roller 24 is turned to draw the floor covering unit 26 rearwardly, winding it up on the cylinder, and thus shifting the load to and discharging it from the back end of the box.

In accordance with the present invention one end of the shaft 25 has secured thereto a ratchet wheel 27 which is turned by the mechanism about to be described.

Mounted on a suitable supporting means at the side of the wagon body adjacent to the ratchet wheel 27, is a fluid cylinder 28 having a piston operated rod 29 projecting from one end thereof. The preferred manner of mounting the cylinder 28 comprises securing to the side beam 29, an angle bar 30 to which is secured in any suitable manner an upstanding bracket 31. The bracket 31 carries a horizontal pin 32 which passes through an opening in a mounting arm 33 which is secured to the forward end of the cylinder 28. Thus the piston rod 29 is directed toward the back of the vehicle.

The piston cylinder has connected with the front and rear ends thereof the fluid pipes 34 and 35 respectively by which the power fluid is delivered into the front end of the cylinder and out of the rear end and vice versa, by the hereinbefore referred to reversible fluid pump, not shown.

Upon the outer and rear end of the piston rod 29 is a head 36 from the inner side of which extends an arm or pin 37 carrying a supporting slide 38. This slide 38 is mounted for reciprocal movement in a guide track 39 which is secured horizontally to the adjacent side of the vehicle structure as, for example, upon the plate 39 which carries the opposite end of the fluid cylinder.

The ratchet gear 27 is straddled by an upper and a lower substantially U-shaped rock yoke 40 and 41 respectively. These yokes have spaced parallel side leg portions 40a and 41a and the free ends of the legs of the yokes are in overlapping relation and are apertured to receive the shaft 25 upon which they are oscillatably mounted. As shown the upper yoke 41 stands up above the ratchet wheel and the lower yoke hangs down below the wheel.

The numerals 42 and 43 designate upper and lower pitmans which are pivotally coupled respectively to the upper and lower yokes as indicated at 44 and 45. These pitmans extend forwardly in convergent relation and are pivotally connected to the piston head 36 by the pivot pin 46.

Connected between the side legs 40a of the top yoke 40 and extending across the toothed periphery of the ratchet wheel, is a pivot pin 47 upon which is pivotally mounted a pawl 48 which extends rearwardly and downwardly for operative connection with the teeth of the ratchet gear. A spring 49 constantly urges the pawl downwardly into contact with the gear.

A similar pawl 50 is mounted between the legs 41a of the lower yoke 41, upon a pin 51 and the free end of this pawl is directed upwardly and forwardly and maintained in yielding contact at all times with the teeth of the ratchet gear, by a spring 52.

Mounted in a suitable position upon the side of the vehicle body, adjacent to the piston rod head 36, is a three-way over center type of switch which is generally designated 53 and from which extends forwardly to the operating mechanism for the fluid power pump, not shown, the current conducting cable 54.

This switch unit 53 is of standard well known construction and accordingly it is not believed necessary to illustrate or describe any of the details thereof.

The switch structure 53 includes an actuating arm or lever 55 which stands upright and terminates at its upper end in an eye 56. Slidably extending through the eye 56 is an end of a rod 57 which carries the two adjustable stops 58 which are spaced apart and have the eye 56 of the switch arm disposed therebetween. This rod 57 extends at its other end downwardly to and is secured to the piston head 36 as illustrated so that as the piston rod is moved backwardly and forwardly the free end of the rod 57 which carries the stops 58, will be reciprocated through the eye 56 of the switch arm 55 and the stops will alternately be brought into contact with the eye 56 so as to oscillate the arm. Thus the switch will be made to operate to alternately reverse the current flow to the operating mechanism, not shown, for the fluid pump, hereinbefore referred to.

It will be readily apparent from the foregoing that when the fluid pump is forcing fluid into the bottom of the forward end of the cylinder 28 through the line 34 and drawing it out from the other end through the line 35 the piston rod will be forced rearwardly. As the limit of movement rearwardly of the piston rod is reached one of the stops 58 will engage the switch arm 55 to effect the reverse flow of electric current to the pump operating mechanism whereupon the pump will be reversed and the fluid will then be forced into the cylinder 28 through the line 35 and extracted through the line 34, thereby causing the piston rod 29 to move in the reverse direction or forwardly with respect to the vehicle structure.

In the rearward movement of the piston rod the top yoke 40 will be swung rearwardly and the pawl 48 will engage the rear to turn the same clockwise. The lower yoke 41 will also be swung forwardly but the pawl 50 thereof will merely ride over the ratchet wheel teeth. Upon the reverse motion of the piston rod, that is upon movement of the rod forwardly or into the cylinder 28, the two yokes 40 and 41 will have their outer ends swung toward the front of the structure, which action will tend to close the pitmans 42 and 43, and the lower pawl 50 will then exert thrust on the gear wheel while the upper pawl 48 will merely ride over the gear or ratchet wheel teeth. Thus it will be seen that in both strokes of the piston rod rotary motion will be imparted to the roller 24 to effect the winding up thereon of the fabric 26.

While there has been illustrated and described an electric switch control means for reversing the fluid pumping mechanism, it is to be understood that the invention is not limited to this specific type of control as it is contemplated as being within the scope of the invention to employ a reversing valve mechanism for reversing the flow of fluid through the pipe lines 34 and 35 in those tractor structures which are equipped only with a fluid pump without a reversible electric operating means. Under such conditions an ordinary fluid reversing valve such as that generally designated 59 might be employed and the actuating arm 60, having an eye 61 at its upper end, would then have the control rod 57 connected through the eye so that as the control rod 57 is reciprocated the stops 58 would effect the back and forth swinging of the arm 60 and thereby reverse the flow of fluid through the pipe lines 34 and 35.

Figure 8 illustrates another method of supporting the forward or outer end of the piston rod 29.

As previously set forth the inner or base end of the fluid cylinder 28 is mounted upon a pin 32 whereby the outer end of the cylinder may have vertical swinging motion if required. Such swinging motion is not present in the construction where the guide 39 is employed but it is present in the modified construction shown in Figure 8.

In this modified construction the piston rod is designated 39' and as shown there is provided on the side of the truck body a suitable mounting or support 70 for a pin 71 upon which is oscillatably supported, from one end, a swinging arm 72.

The lower end of the arm is pivotally coupled, by a pivot pin 73, with the yoke 36' forming the end of the piston rod with which are connected the pitmans 42'. These pitmans function in the same manner as the pitmans 42, as will be readily apparent and accordingly it is not believed that a further description of the action of the same is required.

It will thus be seen from the foregoing that the arrangement shown in Figure 8 provides a simpler means for supporting the free outer end of the piston rod than the arrangement previously set forth.

From the foregoing it will be seen that there is provided by the present invention a novel mechanism which may be either electrically or mechanically controlled, by means of which continuous smooth movement of the load shifting canvas unit may be effected for unloading ensilage into a chute or blower or for effecting the continuous unloading and distribution of material over the ground while the wagon or truck is in motion.

I claim:

1. In a wheeled vehicle having sides, a floor and an end open for the discharge of material, a fabric floor covering, a roller supported across the said open end at floor level for rotation and having said covering attached thereto to be wound thereon, a sprocket wheel on one end of the roller, a fluid power cylinder supported at the side of the vehicle adjacent to said wheel, a piston rod projecting from said cylinder, a member pivoted to swing on the axis of the wheel, said member being of substantially U-form and straddling the wheel, a spring pressed pawl carried between the sides of said member and engaging the teeth of the wheel, a pitman pivotally connected at one end to the piston rod and at the other end to the U-member, a moving support connecting the said one end of the piston rod with the adjacent side of the vehicle for guiding the said end of the rod in a fixed path, and means for alternately delivering operating fluid to the ends of the cylinder.

2. The invention as set forth in claim 1, wherein the said support comprises a laterally extending pin carried by the said end of the piston rod, a head on the pin, and a guide carried by the said side of the vehicle and in which said head slides.

3. The invention as set forth in claim 1, wherein the said support comprises an arm pivotally suspended from the said adjacent side of the vehicle, and a pivot coupling between the lower end of said arm and the said one end of the piston rod.

ERNEST JOHN SIEVERS.

References Cited in the file of this patent

UNITED STATES PATENTS

| Number | Name | Date |
|---|---|---|
| 1,946,452 | Bridges | Feb. 6, 1934 |
| 2,340,983 | Pfeiffer et al. | Feb. 8, 1944 |
| 2,448,122 | Recker | Aug. 31, 1948 |
| 2,458,290 | Monroe | Jan. 4, 1949 |
| 2,529,777 | McInnis | Nov. 14, 1950 |
| 2,588,845 | Kaderavek | Mar. 11, 1952 |
| 2,599,741 | Bishman et al. | June 10, 1952 |